United States Patent Office 3,839,549
Patented Oct. 1, 1974

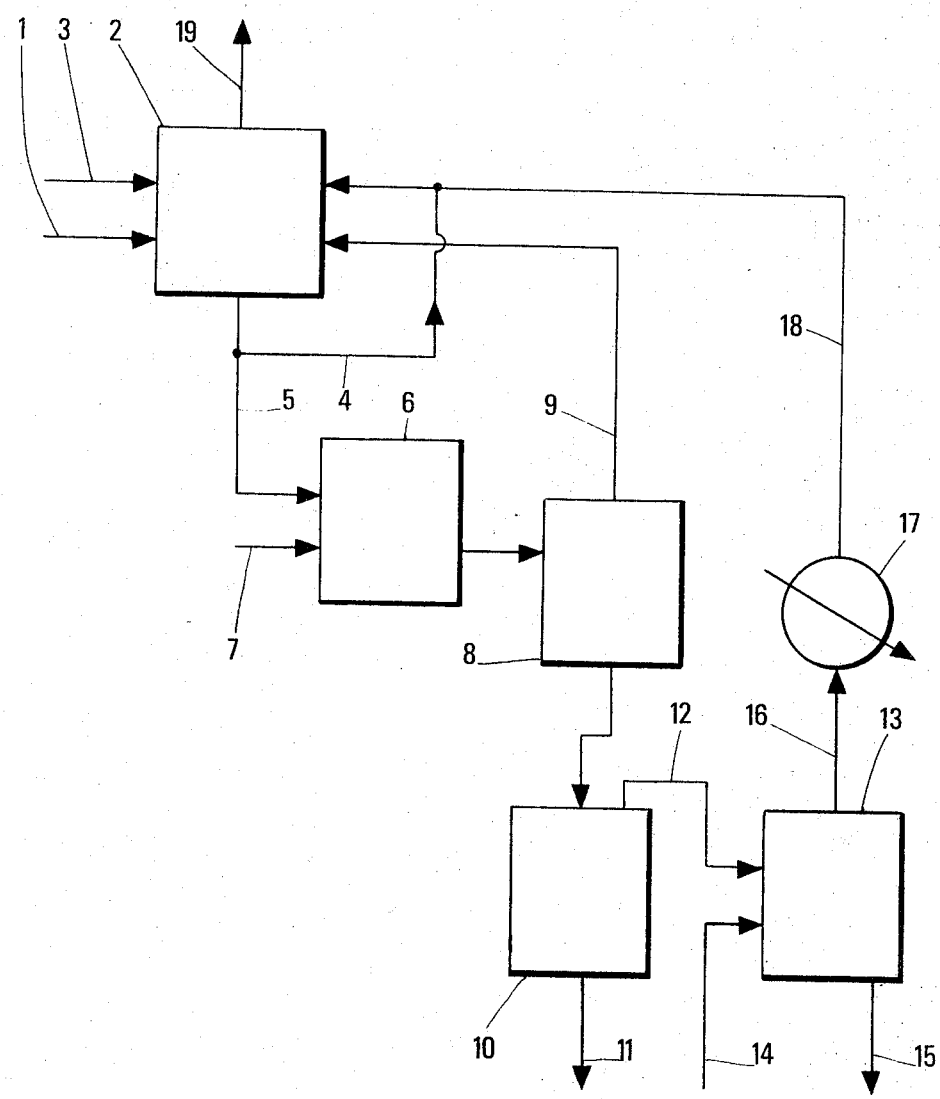

3,839,549
PROCESS FOR REMOVING SULFUR DIOXIDE FROM INDUSTRIAL GASES
André Deschamps, Chatou, Claude Dezael, Maisons-Laffitte, and Philippe Renault, Noisy-le-Roi, France, assignors to Institut Francais du Petrole, des Carburants et Lubrifiants
Filed July 17, 1972, Ser. No. 272,448
Claims priority, application France, July 20, 1971, 7126612
Int. Cl. C01b 17/00, 17/60; C01c 1/10
U.S. Cl. 423—575       18 Claims

ABSTRACT OF THE DISCLOSURE

Sulfur dioxide is removed by scrubbing with aqueous ammonia or ammonium sulfite, contacting the resulting solution with $H_2S$ so as to form ammonium thiosulfate, vaporizing water therefrom, heating the thiosulfate to form sulfur, water, sulfur dioxide and ammonia, reacting the sulfur dioxide with hydrogen sulfide, so as to form additional sulfur and recycling the ammonia to the scrubbing stage.

---

The present invention concerns a process for removing sulfur dioxide from a gas and producing elemental sulfur.

Many industrial flue gases, for example those discharged from steam generating plants fed with fuel-oil or other sulfur-containing combustible materials, those discharged from chemical plants, and those discharged from incinerators fuming sulfur-containing compounds, contain sulfur dioxide which is a major pollutant of the atmosphere.

The present purification process may be used for lowering the sulfur dioxide content of industrial gases.

This process comprises several steps:

In a first step, an impure gas containing sulfur dioxide as impurity is contacted with an aqueous absorption solution at a temperature of from 0 to 100° C. and preferably from 30 to 80° C.

The aqueous absorption solution consists of an aqueous solution of ammonia or ammonium neutral sulfite optionally containing some corresponding hydrogen sulfite. The relative proportions of these two salts may be adjusted by an ammonia make-up. The impure gas flows out in a purer state with a lower $SO_2$ content, and the absorption solution is enriched with ammonium hydrogen sulfite. The ammonium sulfite solution recovered from the first step has a concentration corresponding to a molar ratio:

$$\frac{NH_4HSO_3}{(NH_4)_2SO_3}$$

in the range of from 0.5 to 1.5, preferably 1, and to a molar ratio water/sulfites of from 4 to 100.

The absorption of $SO_2$ may be carried out in a mono- or multi-stage column. An aqueous ammonia solution may be introduced as absorption liquid into the higher stages; this solution gets richer and richer in ammonium sulfites and may be withdrawn from the bottom of the column with the above composition. A solution having a rather high ammonium sulfite content may also be used and continuously circulated at a high rate throughout the absorption zone, a fraction thereof only being withdrawn for treatment according to the technique of the following steps. This withdrawn fraction has a content of $SO_2$, in the form of sulfites, approximately corresponding to the amount of $SO_2$ absorbed in the column for the same time; $SO_2$ introduced and $SO_2$ withdrawn are thus balanced, thus permitting a continuous industrial run.

The absorption solution, when admitted in the absorption column, may thus have a quite variable composition corresponding, for example, to a molar ratio $$\frac{Water}{Sulfite \text{ and/or ammonia}}$$

of from 4 to 1000 and to a molar ratio $$\frac{NH_4HSO_3}{(NH_4)_2SO_3 + NH_3}$$

of from zero to one.

An important feature is to adjust the circulation rate so that the liquid outflow from the first step has the above composition.

In a second step, the solution resulting from the first step is contacted with hydrogen sulfide at a temperature of from 20 to 150° C., preferably 30 to 90° C. Ammonium thiosulfate is the essential product according to the scheme:

$$2NH_4HSO_3 + 2(NH_4)_2SO_3 + 2H_2S \rightarrow 3(NH_4)_2S_2O_3 + 3H_2O$$

The amounts of the ammonium sulfite and the hydrogen sulfide solutions are such that the molar ratio:

$$\frac{H_2S}{NH_4HSO_3 + (NH_4)_2SO_3}$$

is preferably from 0.1 to 1 and advantageously close to 0.5.

In a third step, the aqueous phase from the second step, which contains ammonium thiosulfate and, sometimes, unconverted sulfites, is heated in a dryer at a sufficient temperature for evaporating water therefrom and cracking at least a part of the sulfites, if any.

The remaining solid product, which has a high content of ammonium thiosulfate, is withdrawn from the bottom of the dryer and the gas which results from this operation and which essentially contains water and variable amounts of $SO_2$ and $NH_3$ may be recycled to the first step of the process. The temperature of this step is usually between 80 and 170° C., preferably between 100 and 140° C.

In a fourth zone, the dry thiosulfate from the previous step is heated up to 150–400° C. and preferably to 180–350° C. in an oven, so that it is converted to a gas phase containing $SO_2$, $NH_3$ and $H_2O$ and to sulfur which is recovered:

$$(NH_4)_2S_2O_3 \rightarrow S + SO_2 + H_2O + 2NH_3$$

According to an alternative embodiment, the second step is directly followed with the fourth step by raising the temperature from the second step level to the fourth step level; the third step then takes place intermediately in the oven where the fourth step is carried out.

In a fifth step, the gas flow from the fourth step, or eventually from the third and fourth steps, is treated with hydrogen sulfide at a temperature of from 0 to 200° C., preferably 115–170° C.

The reaction is as follows:

$$SO_2 + 2H_2S \rightarrow 3S + 2H_2O$$

Ammonia does not normally react but behaves as a catalyst for said reaction.

When working at low temperature, it is necessary to heat thereafter in order to vaporize the water which, otherwise, would accumulate in the reaction medium.

There are recovered sulfur and a gas flow containing ammonia, vaporized water and sometimes unconverted sulfur dioxide and/or hydrogen sulfide in low amounts. This gas, after cooling and condensation, may be recycled to the first step of the process to reconstitute the absorption solution.

The preferred stoichiometric molar ratio $H_2S/SO_2$ in the fifth step reaction is 2/1, although different ratios may be used, for example 1/1 to 5/1, which is less desirable. It is then necessary to recycle the unconverted reactants.

The fifth step is preferably carried out in the presence of an organic liquid. Many solvents may be used in this step, for example tetramethylenesulfone, N-methyl pyrrolidone, heavy alcohols having, for example, 12–20 carbon atoms, esters of alcohols and, as a general rule, any liquid medium inert with respect to such compounds as $H_2S$ and $SO_2$ at the reaction temperature.

The following solvents are preferably used since they are quite stable: alkylene glycols and their ethers and esters, polyalkylene glycols and their ethers and esters, for example ethylene glycol, polyethylene glycol and their ethers and esters, polypropylene glycols.

These solvents will be referred to as "solvents of the glycol type."

Ethylene glycol, triethylene glycol, heptaethylene glycol, di-1,3-propylene glycol, tetra-1,4-butene glycol, polyethylene glycol of an average molecular weight of about 400, hexaethylene glycol monoacetate and monobutyrate, and 1,3-propylene glycol ethyl ether are examples of these solvents.

The operation is preferably carried out in the presence of a catalyst, for example a conventional one such as an amine, ammonia, a strong mineral base or an alkli or alkaline-earth metal salt of an inorganic or organic acid.

Liquid sulfur is recovered as the product of this fifth step.

The process of the invention may be applied to the purification of a gas which contains $SO_2$ as the sole acidic sulfur compound, for example the flue gas from steam generating plants fed with fuel-oil or any other sulfur-containing combustible material.

The process may also be applied to gases, for example the flue gases from Claus plants, which contain both $SO_2$ and compounds such as $H_2O$, $COS$ and $CS_2$.

The said compounds are converted to $SO_2$, for example by burning at a temperature of from 400 to 600° C. in the presence of oxygen, before being subjected to the treatment according to the invention.

The process applies particularly to gases which have a low $SO_2$ content, for example 0.02–10% and preferably 0.1–2% by volume.

The hydrogen sulfide may be produced by reaction of sulfur with a hydrocarbon or may be recovered from the washing of refinery gas or natural gas with amines.

The invention is illustrated by the accompanying drawing which shows a preferred embodiment thereof.

The impure gas is admitted from pipe 1 into the absorption zone 2. The aqueous absorption solution initially introduced from pipe 3 is recycled through line 4 and the absorption zone. The solution of higher ammonium hydrogen sulfite content is withdrawn through line 5 and introdced into a reactor 6 where it is contacted with hydrogen sulfide introducted through line 7.

The resulting solution essentially contains ammonium thiosulfate; it is fed to a dryer 8 where it is heated sufficiently to obtain the thiosulfate in the dry state. The resulting flue gas which essentially contains steam and some $NH_3$ and $SO_2$ is recycled through line 9 into the absorption zone. The dry thiosulfate accumulates at the bottom of the dryer and is conveyed to an oven 10 where it is heated up to, for example, 200° C. It decomposes; the resulting sulfur flows down in 11 and the gaseous effluent, which contains $H_2O$, $SO_2$ and $NH_3$, is introduced through line 12 into the reactor 13 where it meets $H_2S$ from line 14. The latter reaction zone contains, for example, polyethylene glycol of an average molecular weight of about 400, at 150° C. The formed liquid sulfur is withdrawn through line 15. The vapors, which consist essentially of steam and ammonia, when the stoichiometric proportions of the reaction have been observed, are fed from pipe 16 to an exchanger 17 where water and ammonia are condensed. The resulting aqueous ammonia solution is passed through line 18 and meets the sulfite absorption solution in recirculation line 4. The purified flue gas is withdrawn through stack 19.

EXAMPLE

The flow sheet of the accompanying drawing is used; it provides for a recycling of the absorption liquid through pipe 4.

10,000 Nm.³ of a flue gas are treated with an ammonium sulfite solution in a tower maintained at 50° C. The composition by volume of the flue gas is:

|  | Percent |
|---|---|
| $SO_2$ | 0.2 |
| $CO_2$ | 12 |
| $H_2O$ | 12 |
| $N_2$ | 75.8 |

After treatment, the flue gas contains only 120 p.p.m. by volume of $SO_2$. When a stable run is established, there is recovered, at the bottom of the absorber, a brine which is characterized by the following molar ratios:

$$\frac{H_2O}{\text{Sulfites}} = 9 \quad \frac{NH_4HSO_3}{(NH_4)_2SO_3} = 1$$

A part of this brine is recycled through pipe 4 and $NH_3$ from line 18 is added thereto. The other part, whose sulfite content is proportional to the absorbed $SO_2$, is contacted at 50° C. with pure $H_2S$ fed at the rate of 9.5 Nm.³ per hour. Ammonium thiosulfate is formed.

The resulting aqueous solution is evaporated at 100–130° C. so as to obtain dry ammonium thiosulfate. The flue gas, which essentially contains steam and some $SO_2$ and $NH_3$, is recycled into the fumes absorption tower. The thiosulfate is passed into an oven where it decomposes at about 300° C. 21 kg. of sulfur per hour are collected. The vapors withdrawn from the oven are fed to a reaction vessel which contains polyethylene glycol of an average molecular weight of 400, maintained at 140° C. This reaction vessel is fed with pure $H_2S$ at the rate of 28.4 Nm.³ per hour. 63 kg. of liquid sulfur per hour are recovered from the bottom of the reaction vessel, and, from the top thereof, vapors which are condensed, thus forming an ammonia solution which is fed back to the absorption zone.

What we claim as our invention is:

1. A process for removing sulfur dioxide from a gas, which comprises (a) contacting the gas with an aqueous solution of ammonium sulfite or ammonia, at a temperature of from 0 to 100° C., so as to obtain a solution of relatively higher ammonium hydrogen sulfite content, (b) contacting the solution from step (a) with hydrogen sulfide, at 20–150° C., so as to form ammonium thiosulfate, (c) then heating the resulting aqueous thiosulfate solution up to a temperature at which water vaporizes therefrom to obtain solid ammonium thiosulfate, (d) heating the solid ammonium thiosulfate from step (c) up to 150–400° C., so as to decompose it to sulfur, water, sulfur dioxide and ammonia, (e) contacting the gas phase from step (d) with hydrogen sulfide, in the presence of an organic solvent, so as to produce sulfur by reaction of hydrogen sulfide with sulfur dioxide, separating sulfur, condensing the vapors and feeding back the condensate to step (a).

2. A process according to claim 1, wherein the aqueous absorption solution from step (a) has a concentration corresponding to a molar ratio $$\frac{H_2O}{NH_4HSO_3 + (NH_4)_2SO_3}$$

of from 4 to 100 and a molar ratio $$\frac{NH_4HSO_3}{(NH_4)_2SO_3}$$

of from 0.5 to 1.5.

3. A process according to claim 1, wherein the aqueous absorption solution of step (a) has a composition corresponding to a molar ratio of water to ammonium sulfite and/or ammonia of from 4 to 1000 and to a molar ratio $NH_4HSO_3/(NH_4)_2SO_3+NH_3$ of from zero to 1.

4. A process according to claim 1, wherein hydrogen sulfide is used in step (b) in a molar ratio $H_2S$/total sulfites of from 0.1 to 1.

5. A process according to claim 1, wherein the temperature of step (c) is from 80 to 170° C.

6. A process according to claim 1, wherein step (e) is carried out in an organic solvent selected from the sulfones, pyrrolidones, heavy alcohols, alcohol esters, alkylene glycols, polyalkylene glycols, alkylene glycol ethers and esters and polyalkylene glycol ethers and esters.

7. A process as defined by claim 1, wherein the temperature of step (c) is 100–130° C.

8. A process as defined by claim 1, wherein the temperature of step (d) is 180–350° C.

9. A process as defined by claim 5, wherein the temperature of step (d) is 180–350° C.

10. A process as defined by claim 7, wherein the temperature of step (d) is 180–350° C.

11. A process according to claim 2, wherein the aqueous absorption solution of step (a) has a composition corresponding to a molar ratio of water to ammonium sulfite and/or ammonia of from 4 to 1000 and to a molar ratio $NH_4HSO_3/(NH_4)_2SO_3+NH_3$ of from zero to 1.

12. A process according to claim 11, wherein hydrogen sulfide is used in step (b) in a molar ratio $H_2S$/total sulfites of from 0.1 to 1.

13. A process according to claim 12, wherein the temperature of step (c) is from 80 to 170° C.

14. A process as defined by claim 12, wherein the temperature of step (c) is 100–130° C.

15. A process as defined by claim 12, wherein the temperature of step (d) is 180–350° C.

16. A process as defined by claim 14, wherein the temperature of step (d) is 180–350° C.

17. A process as defined by claim 1, wherein the ammonium thiosulate is dried in step (c).

18. A process as defined by claim 16, wherein the ammonium thiosulfate is dried in step (c).

References Cited

UNITED STATES PATENTS

| | | | |
|---|---|---|---|
| 3,431,070 | 3/1969 | Keller | 423—514 |
| 3,345,131 | 10/1967 | Ingraham | 423—514 |
| 3,591,335 | 7/1971 | Grimsley et al. | 423—514 |
| 3,635,820 | 1/1972 | Urban | 423—514 |
| 1,795,120 | 3/1931 | Hansen | 423—222 |
| 1,795,121 | 3/1931 | Hansen | 423—222 |
| 2,881,047 | 4/1959 | Townsend | 423—575 |

OTHER REFERENCES

Handbook of Chemistry and Physics, 43rd edition, Chemical Rubber Publishing Company, Ohio, 1962, pp. 534–5.

OSCAR R. VERTIZ, Primary Examiner

G. P. STRAUB, Assistant Examiner

U.S. Cl. X.R.

423—242, 356, 514, 541